Feb. 19, 1929.  1,702,865
J. GÉRIN
MOTOR PROPELLING UNIT FOR MOTOR VEHICLES
Filed May 10, 1926   4 Sheets-Sheet 3

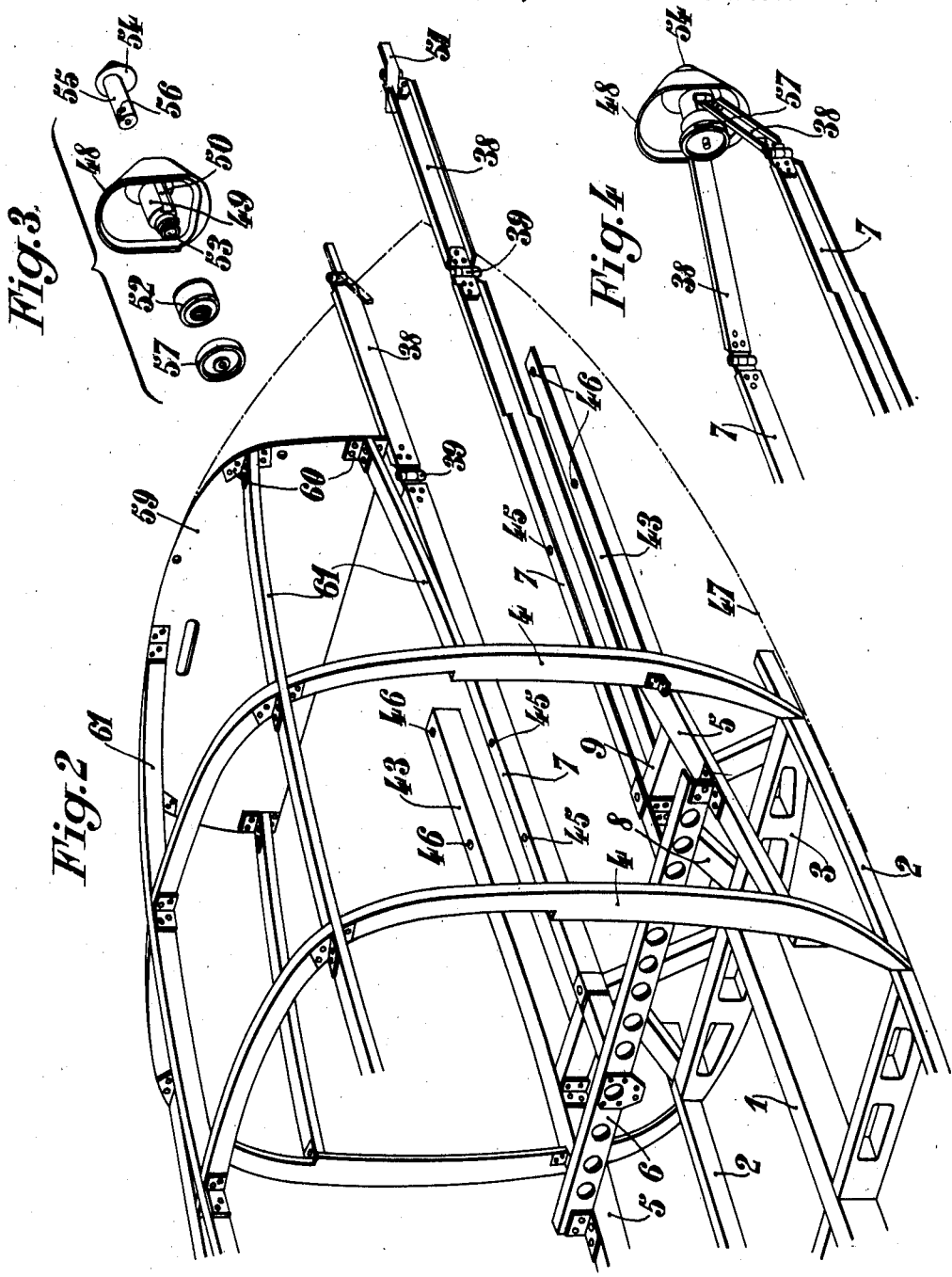

J. Gérin
inventor
By: Marks & Clerk
Attys

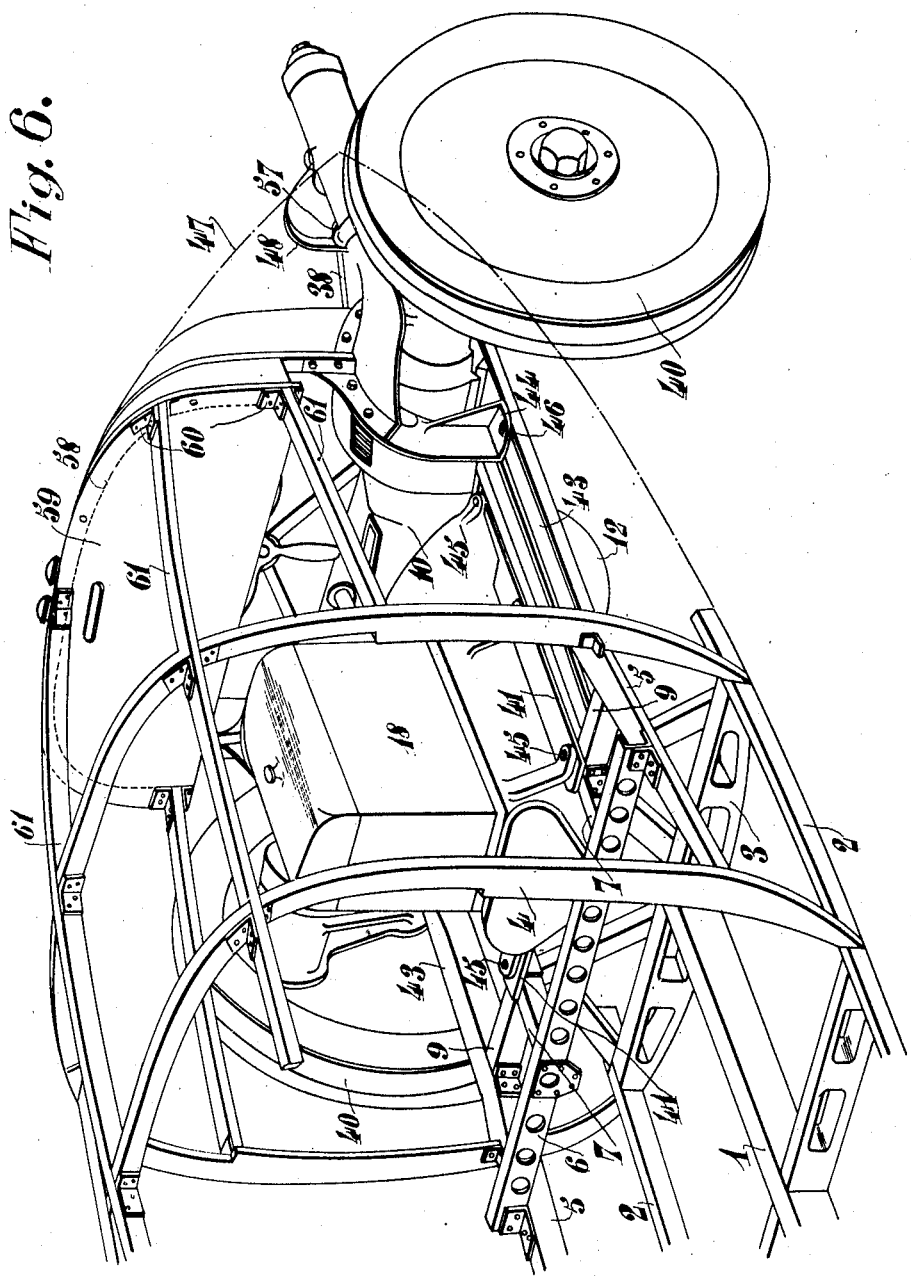

Patented Feb. 19, 1929.

1,702,865

UNITED STATES PATENT OFFICE.

JACQUES GÉRIN, OF PARIS, FRANCE.

MOTOR-PROPELLING UNIT FOR MOTOR VEHICLES.

Application filed May 10, 1926, Serial No. 108,158, and in France March 19, 1926.

The present invention relates to a motor propelling unit for motor vehicles, and particularly for motor vehicles with closed carriage body the framework of which is in one piece with the chassis.

This motor propelling unit which comprises the engine and its feeding and cooling devices and the connection mechanism between the driving shaft and the driving wheels, is arranged in such a manner that it can be connected to the chassis of the vehicle or easily separated therefrom.

The accompanying drawing illustrates by way of example only a form of construction of the motor propelling unit forming the subject-matter of the invention.

Fig. 2 is a perspective view showing the rear part of the framework of the carriage body of a motor vehicle, on which fits the motor propelling unit of Fig. 1.

Figs. 3 and 4 are perspective views of details.

Fig. 6 is a perspective view showing the manner of mounting the motor propelling block on the chassis or frame of the car.

Figure 1:
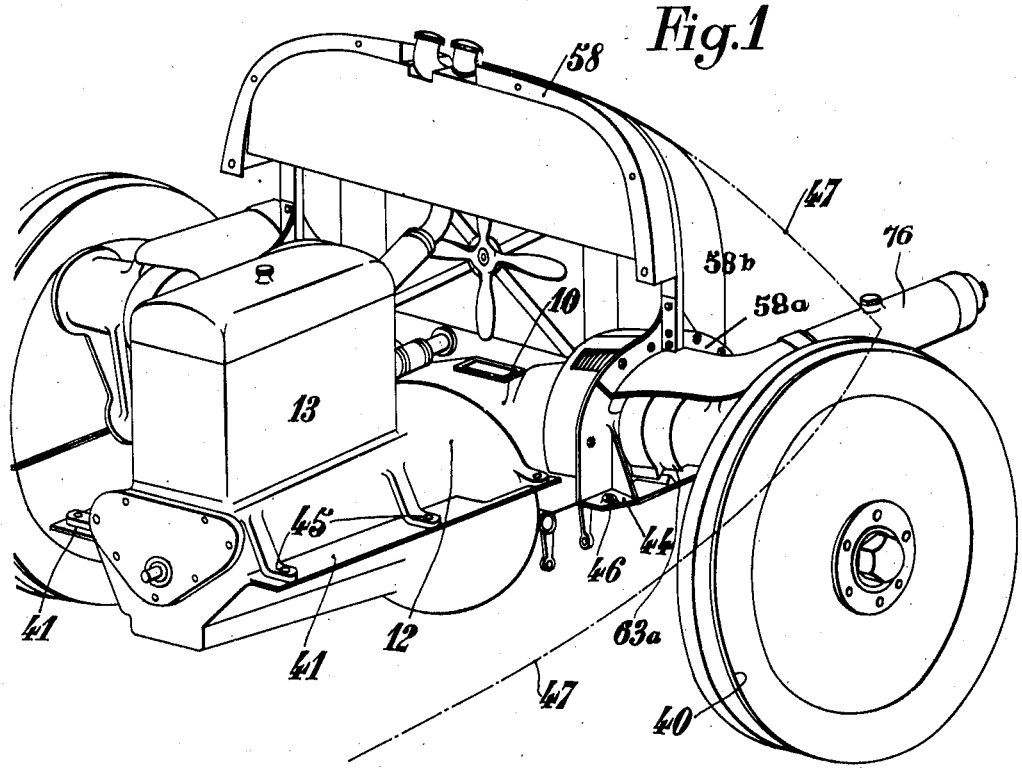
Fig. 1 is a perspective view of the motor propelling unit.

The motor propelling unit, forming the subject-matter of the invention, preferably fits at the rear of a motor vehicle the carriage body of which has a framework in one piece with the chassis. Fig. 2 shows the rear part of such a chassis framework and carriage body.

The chassis (Fig. 2) has an axial longitudinal bearer 1 and two side longitudinal bearers 2 stayed by a rear cross member 3. The hoops 4 of the carriage body which extend from the side longitudinal bearers 2 are stayed, at their lower part, by bars 5 on which is secured, by angle bars and rivets, a cross member 6. The bars 5 extend, by forming the longitudinal bearers 43, beyond the longitudinal bearers, and between the said bars and substantially at the same level are arranged two longitudinal bearers 7 secured at one end on the cross member 6 and supported relatively to the cross member 3 and bars 5, by means of trusses 8 and stay members 9.

Figure 5:
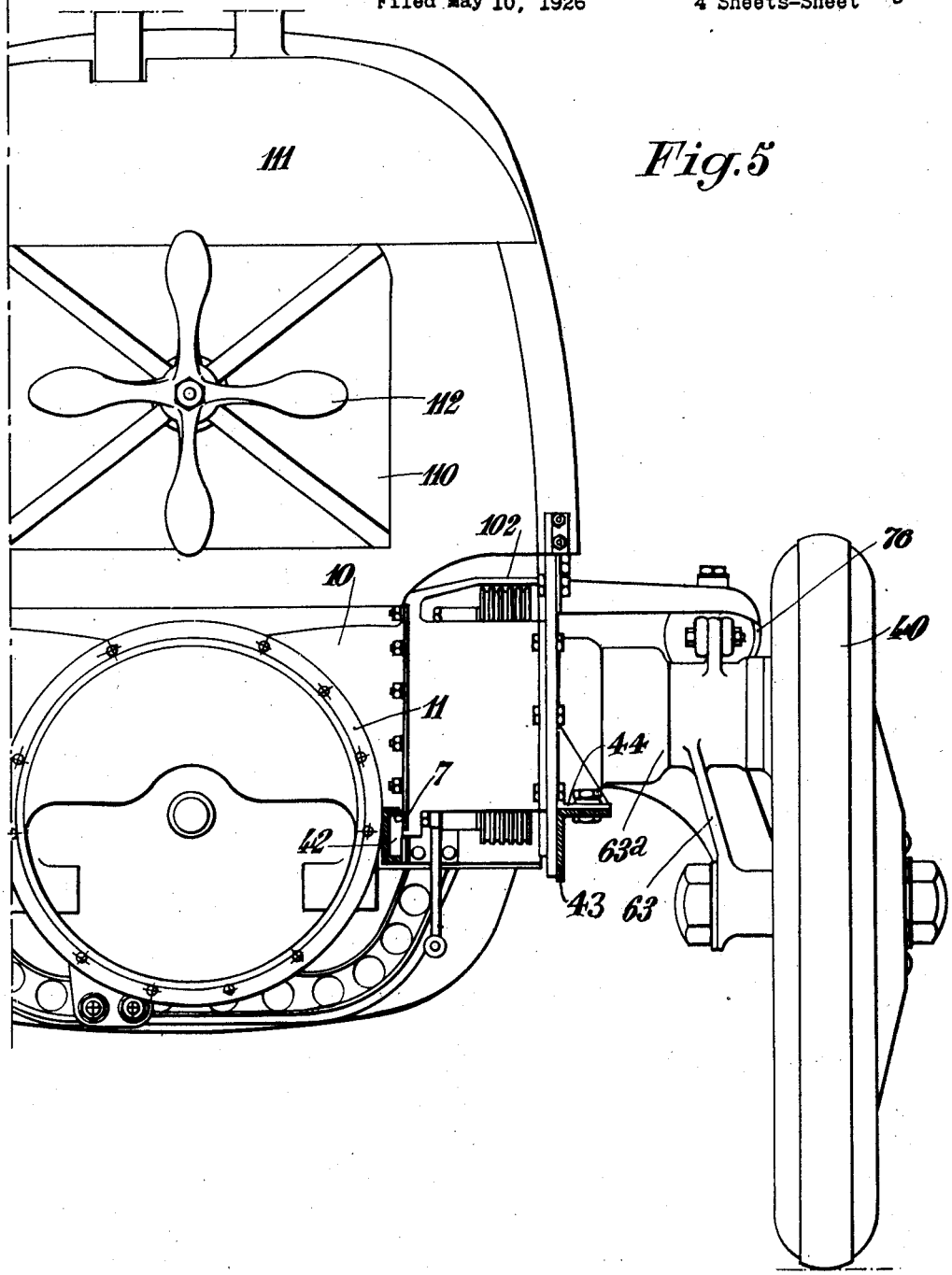
Fig. 5 is a front elevation of the motor propelling unit, the engine being removed.

The longitudinal bearers 7 constitute the cradle-support on which rests the engine of the motor-propelling unit. The latter comprises a casing forming a frame composed of several members assembled by means of studs or bolts. The central part of this casing or frame 10 is provided with an annular cheek 11 (Fig. 5) on which is secured by means of bolts a corresponding cheek of the casing 12 of the engine 13. The fixing of the motor propelling unit in position on the carriage body, at the rear part of the vehicle is especially effected through the frame or casing 12 of the engine proper. For that purpose, movable longitudinal bearers 38 being arranged in alignment with the fixed longitudinal bearers 7 on which they are hinged at 39, the motor propelling unit which can run on the wheels 40, is brought in alignment with the carriage body suitably supported near its rear part by screw jacks or trestles. The said unit is then displaced according to the longitudinal axis of the vehicle so that the movable longitudinal bearers 38 pass under the bolsters 41 of the casing and through passages provided at 42, Fig. 5. The side longitudinal bearers 43 fit under the bolsters 44 (Fig. 5) and the bolsters 41 and 44 are respectively connected with the longitudinal bearers 7 and 43 by means of bolts (eight bolts only altogether). The placing in position of the bolts through the holes 45 and 46 is effected through openings provided with movable panels and formed in the casing 47 which constitutes the extension of the casing of the carriage body proper and belong to the motor propelling unit. This casing which, for the clearness of the drawing, is simply illustrated by its apparent outline (dot and dash lines 47) is terminated at its rear part by a removable shell 48 (Fig. 3). This shell carries an inner hub 49 cut away at 50 according to two diametrically opposed generatrices for receiving keys 51 hinged to the ends of the movable longitudinal bearers 38. These longitudinal bearers, owing to their connection by hinges 39 with the fixed longitudinal bearers 7 can be brought nearer together at their free ends, for permitting to insert the keys 51, previously bent down as shown in dot and dash lines in Fig. 1, into a nut or ring 52 internally screw threaded. This ring 52 is screwed on the screw threaded end 53 of the hub 49, so as to hold the keys 51 pressed against the bottoms of the notches 50. The extreme point of the shell is constituted by a rubber cone or tip 54, or any other resiliently distortable material, suitably secured on a metal rod 55 provided with a notch 56. This rod 55 is fitted through the inner bore of the hub 49 and its end projecting relatively to the outer face of the nut 52 receives a ring 57 provided with a finger fitting in the notch 53, by constituting a bayonet joint. The rod 55, when removed, allows the passage of the starting crank, the inner bore of the hub 49 being in alignment with the driving shaft, acts as a support for this crank. The shell 48 is protected against end shocks by an india rubber tip 54 which becomes distorted when encountering an obstacle and then takes back its normal shape, when the obstacle is removed. The fitting of the tip of the ends of the movable longitudinal bearers is effected through openings provided with movable panels and formed in the casing 47. The motor propelling unit is finally secured on the carriage body by connecting, by means of screws or bolts, the frame 58 of the tanks and water radiator (Fig. 1) with a sheet-iron plate 59 secured by angle bars 60 to the ends of the longitudinal bars 61 of the framework of the carriage body (Fig. 2).

The wheels 40 of the motor propelling unit have an independent suspension and, for that purpose, their swivels 62 are mounted at the free end of arms 63 provided with a hollow head 63$^a$ centered by a ball bearing 64 and a bearing 64$^a$ on a part rigid with the motor propelling unit. The resilient suspension of the wheels is ensured, in a well known manner, by springs enclosed in a hollow body 76 rigid with the propelling unit.

The motor propelling unit comprises all the elements necessary for the working of the engine and for the connection between the latter and the driving wheels. The portion of the carriage body on which this unit is secured, comprises the space necessary for the passengers and the steering wheels with the steering control mechanism. This unit is provided with feeder, radiator 110, and the gasoline and oil tanks 111 which are secured, by welding or riveting, to a hoop 58 fastened at its ends, to wheels 58$^a$ of the block, by bolts 58$^b$ or other equivalent means. The cooling radiator is provided, in the known manner, with an air sucking propeller 112 the actuation of which is obtained by the pulleys 113 connected by a belt or chain 114. The admission of the air is effected through orifices provided in the sides of the carriage body casing 47 of the said unit, orifices being provided at the rear of this casing for the evacuation of the air which has passed through the radiator. The said unit comprises also a muffler, which, for greater clearness, has not been illustrated in the drawing. To sum up, the motor propelling unit being separated from the vehicle on which it fits, it is possible, by suitably supporting it, to cause the engine to rotate and to effect the adjustment of the same with the same facility as if the engine was mounted on a testing stand. Likewise, when the unit is connected to the front part of the carriage body of the motor vehicle, if it is desired to inspect or repair with facility any part or member of this unit, it suffices first to remove the shell 48 then, to remove lateral panels from the casing 47, to bring back the movable longitudinal bearers 38 in alignment with the longitudinal bearers 7, and, after removal of the bolts, connecting the bolsters 41 and 44 to the longitudinal bearers 7 and 43 and the hoop 58 of the sheet-iron plate 59, to move the unit backward by causing it to run on its wheels, whilst the front part of the carriage body is supported by means of jacks. The unit is moved backward until ready access may be had to the member to be inspected. The inspection and, if necessary, the repair being terminated, the unit is again moved forward and the connecting bolts are locked. The junctions of the elements of the various control riggings are effected and the vehicle is in running order.

Moreover, it will be noted that a vehicle can have one or more spare propelling units, so that the repairs can be effected with ease at the garage, without interrupting the service of the vehicle, since the substitution of a unit for another is effected in a very short time.

What I claim as my invention and desire to secure by Letters Patent is:

In a motor vehicle with closed carriage body having the same skeleton as the chassis, a motor propelling-unit comprising, mounted on one and the same frame, an engine, the feeding and cooling parts of the said engine, two driving wheels having an independent suspension, variable speed connecting means between the driving shaft and the said driving wheels, two bolsters on the casing of the engine and two bolsters on the portions of the unit frame adjacent to the wheels, two central longitudinal bearers forming an extension of the rear part of the carriage body skeleton, two movable longitudinal bearers jointed to the ends of the said central longitudinal bearers for permitting the passage of the unit between the movable longitudinal bearers when the latter are arranged in alignment with the central longitudinal bearers, side longitudinal bearers for supporting the bolsters of the portions of the unit frame adjacent to the wheels, means for securing the bolsters of the engine casing on the central longitudinal bearers, and the bolsters of the portions of the unit frame adjacent to the wheels, on the side longitudinal bearers, a hoop on the unit frame supporting the tanks and the radiator of the engine, a vertical sheet-iron plate at the rear part of the carriage body, and means for rigidly connecting the said hoop to the said sheet-iron plate, keys respectively hinged to the free end of each of the movable longitudinal bearers, a ring-nut for holding the said keys together, a shell forming an extension of the motor propelling unit, a screw threaded hub within the said shell for permitting to screw therein the said ring-nut, flat surfaces on the said hub for serving as a bearing for the keys of the movable longitudinal bearers, a rod carrying a rubber base and passing through the hub of the shell, a notch at the end of the said rod for receiving, by a bayonet assemblage, a ring forming a lock-nut by the ring-nut mounted on the hub.

In testimony whereof I have signed my name to this specification.

JACQUES GÉRIN.